United States Patent [19]

Midorikawa

[11] Patent Number: 4,520,787
[45] Date of Patent: Jun. 4, 1985

[54] INTAKE AIR HEATING SYSTEM FOR AN INTERNAL COMBUSTION ENGINE

[75] Inventor: Minoru Midorikawa, Mitaka, Japan

[73] Assignee: Nissan Motor Co., Ltd., Yokohama, Japan

[21] Appl. No.: 565,652

[22] Filed: Dec. 27, 1983

[30] Foreign Application Priority Data

Dec. 28, 1982 [JP] Japan .................. 57-196484[U]

[51] Int. Cl.³ .................................. F02M 31/00
[52] U.S. Cl. .............................. 123/556; 123/552
[58] Field of Search ........................ 123/556, 552

[56] References Cited

U.S. PATENT DOCUMENTS

| 1,221,536 | 4/1917 | Hopkins | 123/556 |
| 1,272,570 | 7/1918 | Sweet | 123/555 |
| 1,370,459 | 3/1921 | Lippoldt | 123/556 |
| 1,381,331 | 6/1921 | Pohl | 123/556 |
| 2,833,261 | 5/1958 | August | 123/556 |
| 3,024,778 | 3/1962 | Townsend | 123/556 |
| 4,079,715 | 3/1978 | Masaki | 123/556 |
| 4,175,524 | 11/1979 | Coddington | 123/556 |
| 4,365,607 | 12/1982 | Ishikawa | 123/556 |
| 4,374,512 | 2/1983 | Starun | 123/556 |

Primary Examiner—Ronald H. Lazarus
Attorney, Agent, or Firm—Schwartz, Jeffery, Schwaab, Mack, Blumenthal & Koch

[57] ABSTRACT

An intake air heating system for an internal combustion engine having an air cleaner of the temperature regulating type has a heating chamber to heat intake air sufficiently. The heating chamber is formed by bulging partially a heat insulating plate around an exhaust manifold of the engine. A heated-air induction pipe extends from the interior of the heating chamber to the air cleaner.

10 Claims, 7 Drawing Figures

INTAKE AIR HEATING SYSTEM FOR AN INTERNAL COMBUSTION ENGINE

BACKGROUND OF THE INVENTION

This invention relates to an intake air heating system for an internal combustion engine, and more specifically, to an improvement in an air heating passage which is defined around the outer periphery of an exhaust passage as a source of heated air for an intake air heating system having an air cleaner of the temperature regulating type.

Generally, in an internal combustion engine for use with automobiles, it has been well known to use an air cleaner of the temperature regulating type having a temperature regulating valve which functions to draw air heated in the vicinity of an exhaust passage of the engine into the engine when the temperature of outside air is low, whereby an optimal ratio of air-fuel mixture is provided by regulating the temperature of intake air in a case where the temperature of the outside air varies extremely, for example between summer and winter seasons.

One example of such air cleaners is illustrated in FIG. 1 in which an air heating passage 5 is defined around the outer periphery of an exhaust passage or an exhaust manifold 4 of an internal combustion engine B by means of a heat insulating plate or a manifold cover 3 and is connected through a heated-air induction pipe or a hot air duct 6 to an outside air induction duct 2 for an air cleaner 1. A temperature regulating valve 7 is provided at the junction between the valve 7 and the duct 2.

The temperature regulating valve 7 is opened and closed by a pressure actuator 8 which is communicated, through a temperature sensitive valve 9 attached to the air cleaner 1 downstream of air filter elements (not shown) located therein, with an intake passage 11 downstream of a throttle valve 10 so that negative pressure in the intake passage 11 is applied to the pressure actuator 8 in response to the temperature of intake air drawn into the air cleaner 1.

Specifically, during cold running of the engine at low outside air temperatures, the temperature sensitive valve 9 is opened to apply the decreased pressure in the intake passage 11 of the engine B to the pressure actuator 8 so that the temperature regulating valve 7 is opened to permit air heated in the air heating passage 5 by the hot exhaust passage 4 to be fed to the air cleaner 1 and at the same time to reduce the effective passage area of the outside air induction duct 2 to decrease the amount of cool outside air entering the air cleaner 1.

As a result, the temperature of intake air during cold engine running is raised relative to the outside air so as to effectively prevent back fires resulting from a leaner-than-normal air-fuel ratio of the mixture to be fed to the engine or from an increased mass flow rate of the mixture, which would otherwise be caused by the introduction of intake air at a low temperature during cold running of the engine. Accordingly, heating the intake air serves to maintain a good operating performance of the engine during such cold engine operation.

On the other hand, when the engine is operated at high outside air temperatures, the temperature regulating valve 7 is closed to permit outside air to be fed to the air cleaner 1 only through the outside air induction duct 2.

In this manner, the temperature of intake air is regulated to improve the operating performance of the engine during its cold running.

In the conventional intake air heating system as referred to above, however, the air heating passage 5, acting as a source of heated air to be supplied to the air cleaner 1, is formed by attaching a manihold cover 3 comprising a cover member of the plate or sheet type to the outer periphery of the exhaust passage 4 by means of bolts with a predetermined space or clearance therebetween, and a heated-air outlet 13 for connection with the heated-air induction pipe 6, even if provided in any position of the manifold cover 3, is necessarily placed in close proximity to outside air inlets 14 formed around the peripheral portion of the manifold cover 3 mainly at the side edges of the manifold cover 3, so that cool outside air may be instantaneously led into the air cleaner 1 without being sufficiently heated in the air heating passage 5, thus posing a problem that any satisfactory intake air heating function is not achieved during cold engine running. This is particularly true in a case where the clearance between the exhaust passage 4 and the manifold cover 3 is large due to variations in dimension of these members.

SUMMARY OF THE INVENTION

In view of the above, an object of the present invention is to provide a novel and improved intake air heating system for an internal combustion engine which is compact in size and capable of providing a satisfactory intake air heating function.

Another object of the present invention is to provide an intake air heating system having a heating chamber to retain intake air temporarily to heat the intake air sufficiently.

To achieve the above objects, a feature of the present invention is the provision of an intake air heating system for an internal combustion engine in which a heat insulating plate is arranged so as to form a limited space or clearance of a substantially uniform size between its peripheral edge and the outer periphery of part of an exhaust passage, the heat insulating plate being partially bulged outwardly to define therein a heating chamber of an enlarged cross section for retaining air therein, into which chamber at the central portion thereof a heated-air induction pipe is projected with its open end being close to the exhaust passage such that air drawn into the heating chamber from the outside is retained there and heated sufficiently, the heated air then passing near the exhaust passage into the open end of the heated-air induction pipe and then into an air cleaner. It has been found to be essential that the open end of the heated air induction pipe extend into the heating chamber more than half of the distance between the outer surface of the exhaust passage or manifold and the inner surface of the heating chamber in order that the air drawn into the heating chamber is retained therein and heated sufficiently before it enters into the open end of the heated air induction pipe.

BRIEF DESCRIPTION OF THE DRAWINGS

These and other objects, features and advantages of the invention will be apparent from the following specification thereof taken in conjunction with the accompanying drawing in which.

DETAILED DESCRIPTION OF PREFERRED EMBODIMENTS

Figure 3:
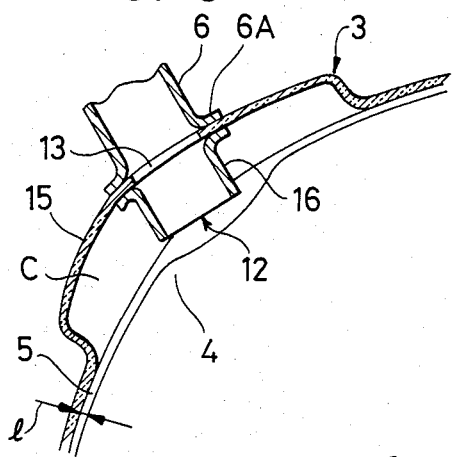
FIG. 3 is a cross-sectional view showing the essential parts of an intake air heating system according to the present invention.

Referring first to FIG. 3, wherein like numerals designate previously described elements, there is illustrated the essential parts of an intake air heating system for an internal combustion engine constructed in accordance with the principles of the present invention. In this embodiment, a heat insulating plate 3 has its peripheral portion conforming to the outer peripheral surface of part of the exhaust passage 4 and is arranged therealong with a limited clearance or space formed uniformly therebetween so as to define therein an air heating passage 5.

The heat insulating plate 3 is partially bulged outwardly to form a bulged portion 15 of a substantially circular cross section, inside of which a heating chamber C of an enlarged cross section is defined for temporarily retaining air passing through the air heating passage 5.

Formed through the bulged portion 15 substantially at the center thereof is a heated-air outlet portion 13 at which a heated-air induction pipe 6 is connected with the bulged portion 15. The pipe 6 has an open end portion 12 extended into the heating chamber C to a position near the surface of the exhaust passage 4. It has been found to be essential that the open end portion 12 extend into the heating chamber C to a position which is greater than one half of the distance between the inner surface of the bulged portion 15 and the outer surface of the exhaust manifold or passage 4 as seen in FIGS. 3, 4, 5, 6 and 7. It is necessary for the open end to extend this distance in order to form a chamber which will retain the air which passes through the air heating passage 5 until it is sufficiently heated.

Specifically, the heated-air induction pipe 6 has a connecting flange 6A firmly secured to the outer surface of the bulged portion 15 of the heat insulating plate 3 by means of spot welding or the like, and a cylindrical member 16 of a predetermined length is secured to the inner surface of the bulged portion of the heat insulating plate 3 similarly by spot welding or the like, the cylindrical member 16 constituting the open end portion 12 of the heated-air induction pipe 6 at the side of the air heating passage 5.

Figure 1:
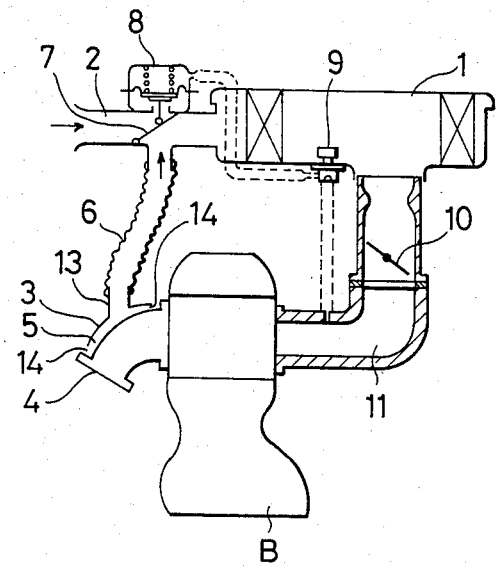
FIG. 1 is a schematic illustration of a conventional intake air heating system for an internal combustion engine.
Figure 2:
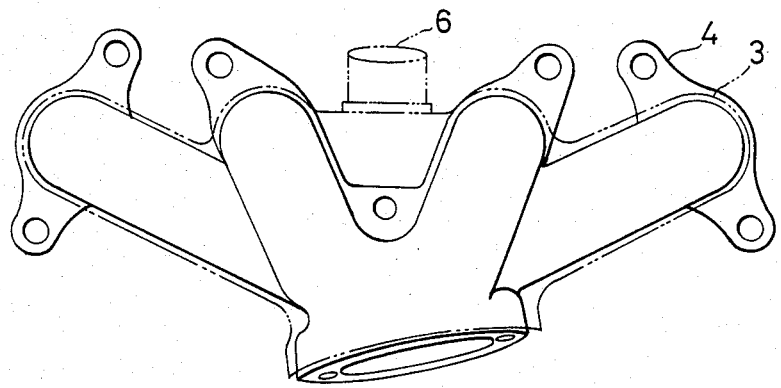
FIG. 2 is a schematic view showing an exhaust manifold incorporating an intake air heating system according to the present invention.

The construction of the intake air heating system other than the above is substantially the same as that shown in FIG. 1 and hence the detailed description thereof has been omitted here.

In operation, during cold engine running at low temperatures of the external atmosphere, the temperature regulating valve 7 (FIG. 1) is opened and outside air entering the air heating passage 5 from the outside air inlet 14 (FIG. 1) is heated therein by hot exhaust gases passing through the exhaust passage 4 and is then led into the air cleaner 1 (FIG. 1) through the heated-air induction pipe 6 and the now opened temperature sensitive valve 7 so that the heated air in the air cleaner 1 is mixed with cool air drawn therein from the outside air induction duct 2 to be fed to the engine B through the intake passage 11.

In this connection, it is to be noted that almost all of the outside air which has entered the air heating passage 5 is first led into the heating chamber C where its flow speed is reduced so that the air is temporarily retained therein and heated sufficiently. The heated air flows then into the heated-air induction pipe 6 through its open end portion 12 by way of a space formed between the open end portion 12 and the surface of the exhaust passage 4.

On the other hand, a small part of the intake air directly enters the heated-air induction pipe 6 without dwelling in the heating chamber C, but flows along the outer surface of the exhaust passage 4 to the inlet of the pipe 6 and hence is sufficiently heated by the hot exhaust passage 4 until it reaches the open end portion 12 of the heated air induction pipe 6.

As a result, the engine is supplied with outside air which has been heated sufficiently and uniformly and thus the operating performance of the engine during its cold running is markedly improved.

Further, in this embodiment, the aforementioned function is achieved by a simple construction such that the heat insulating plate 3 is partially bulged outwardly and that the heated-air induction pipe 6 is connected to the outwardly bulged portion 15 of the heat insulating plate 3 with its open end portion 12 extended into the latter. This makes the system compact and effectively uses the limited space available in the engine compartment of a vehicle since the overall size of the components surrounding the exhaust passage 4 can be reduced as compared with the conventional system as illustrated in FIG. 1.

FIGS. 4 through 7 respectively show various embodiments of the intake air heating system according to the present invention.

Figure 4:
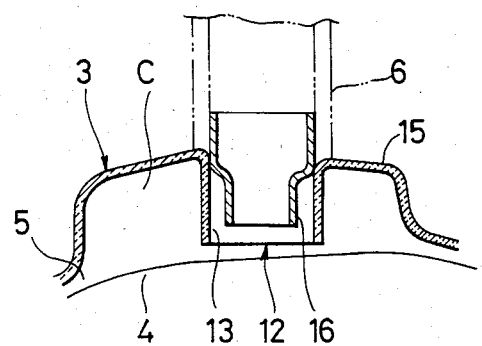
FIGS. 4 through 7 are views similar to FIG. 3 respectively, each showing a modified form of the intake air heating system according to the invention.

Referring to FIG. 4, the heat insulating plate 3 is bent inwardly at the heated-air outlet portion 13 by means of burring and a separate cylindrical member 16 is attached inside the inwardly bent heated-air outlet portion 13 so as to form the open end portion 12 of the heated-air induction pipe 6 into a double cylindrical configuration, thus providing a greater heating effect.

Figure 5:
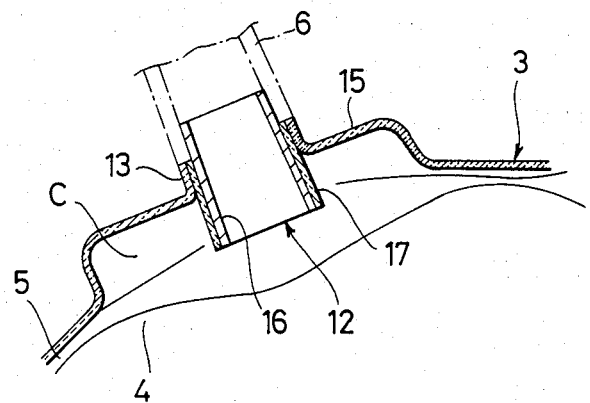

Referring to FIG. 5, the heat insulating plate 3 is bent outwardly at the heated-air outlet portion 13 by means of burring, and a cylindrical member 16, forming the open end portion 12 of the heated-air induction pipe 6, is attached inside the outwardly bent outlet portion 13 with a heat insulating material 17 interposed threrebetween for preventing the lowering of temperature at the open end portion 12 of the heated-air induction pipe 6.

Figure 6:
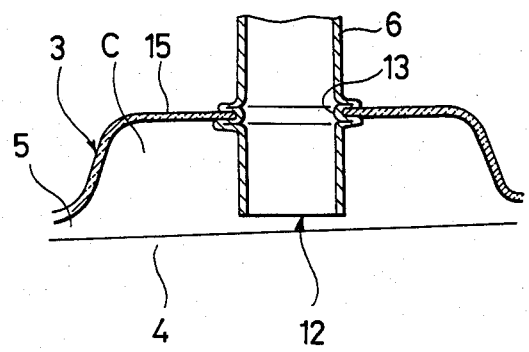
Figure 7:
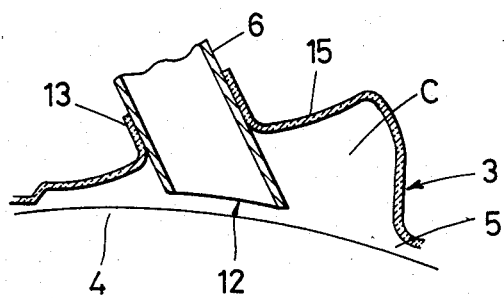

Referrings to FIGS. 6 and 7, the heated-air induction pipe 6 is extended at its one end into the heating chamber C to form an integral open end portion 12. In FIG. 6, the heated-air induction pipe 6 is integrally connected with the heat insulating plate 3 by means of pressing or the like, and in FIG. 7, the heated-air induction pipe 6 is secured along its outer surface to the inner surface of the heat insulating plate 3 at the outwardly bent outlet portion 13 by means of welding or the like with its extended open end portion 12 cut obliquely so as to conform to the contour of the outer surface of the exhaust passage 4.

The present invention as referred to above provides the following advantages. Due to the fact that a heating chamber for retaining intake air is formed around an open end portion of a heated-air induction pipe inside an air heating passage defined by a heat insulating plate, it is possible to sufficiently supply heated air to the engine without enlarging the overall construction of the intake air heating system.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. An intake air heating system for an internal combustion engine having intake and exhaust passages respectively, connected to said engine, an air cleaner connected to said intake passage and an outside air induction duct connected to said air cleaner, said intake air heating system comprising:

a manifold cover comprising edge portions surrounding the outer surface of said exhaust passage with a limited clearance for air inlet therebetween and at least one enlarged portion extending outwardly from said edge portions to form a heating chamber between said manifold cover and the outer surface of said exhaust passage, and a heated-air induction pipe for connecting the inside of said cover with said outside air induction duct, said induction pipe being inserted into said manifold cover and projecting towards the outer surface of said exhaust passage, the projecting length of said induction pipe inside of said cover extending at least more than half of the distance between the outer surface of said exhaust passage and the inner surface of the enlarged portion, whereby an effective heating chamber is formed with openings for air inlet only at said limited clearance and air outlet only at the end of said induction pipe, said chamber being formed by the manifold cover on the outer surface of said exhaust passage, whereby intake air drawn through said limited clearance is temporarily retained and heated in said heating chamber.

2. The intake air heating system of claim 1, wherein said heating chamber is formed by bulging a portion of said manifold cover.

3. The intake air heating system of claim 1, wherein almost all of the outside air which has entered the clearance is led into the heating chamber.

4. The intake air heating system of claim 1, wherein said open end portion is constituted by a separate cylindrical member secured to the inner surface of said bulged portion of said manifold cover and connected with an inlet portion of said heated-air induction pipe.

5. The intake air heating system of claim 1, wherein said open end portion is constituted by an inwardly bent heated-air outlet portion of said bulged portion and a separate cylindrical member provided within said outlet portion to form a double cylindrical configuration.

6. The intake air heating system of claim 1, wherein said open end portion is constituted by a cylindrical member fitted into an outwardly bent heated-air outlet portion of said manifold cover with a heat insulating material interposed therebetween.

7. The intake air heating system of claim 1, wherein said open end portion is constituted by an inlet portion of said heated-air induction pipe inserted in said heating chamber, welded to said manifold cover and cut obliquely so as to conform to the conture of the outer surface of said exhaust passage.

8. The intake air heating system of claim 1, wherein said open end portion is constituted by an inlet portion of said heated-air induction pipe inserted in said heating chamber and integrally connected with said manifold cover.

9. The intake air heating system of claim 1, wherein said manifold cover is formed to conform the outside surface of said exhaust passage to form said limited clearance therebetween.

10. The intake air heating system of claim 1, wherein the clearance between the end of the projecting length of said induction pipe and the exhaust passage is substantially the same as the clearance between said edge portions and said exhaust passage.

* * * * *